United States Patent [19]

Brame et al.

[11] Patent Number: 5,253,253
[45] Date of Patent: Oct. 12, 1993

[54] MESSAGE BUS SLOT UPDATE/IDLE CONTROL IN RF TRUNKING MULTISITE SWITCH

[75] Inventors: Charles P. Brame; Timothy F. Cree; Philip C. Gulliford; Wim A. Imron, all of Forest; Satish Kappagantula, Lynchburg; James L. Teel, Jr., Goode, all of Va.

[73] Assignee: Ericsson GE Mobile Communications Inc., Lynchburg, Va.

[21] Appl. No.: 658,640

[22] Filed: Feb. 22, 1991

[51] Int. Cl.⁵ ............................................. H04J 3/16
[52] U.S. Cl. .................................. 370/85.11; 370/95.1
[58] Field of Search ..................... 370/85.9, 85.11, 67, 370/85.7, 95.1, 68.1

[56] References Cited

U.S. PATENT DOCUMENTS

| | | | |
|---|---|---|---|
| 3,870,825 | 3/1975 | Roberts et al. | 370/85.11 |
| 4,012,597 | 3/1977 | Lynk, Jr. et al. | |
| 4,188,582 | 2/1980 | Cannalte et al. | 325/58 |
| 4,268,722 | 5/1981 | Little et al. | 179/2 E B |
| 4,451,827 | 5/1984 | Kahn et al. | 340/825.52 |
| 4,519,069 | 5/1985 | Pudsey | 370/85.11 |
| 4,550,402 | 10/1985 | Gable et al. | 370/85 |
| 4,578,815 | 3/1986 | Persinotti | 455/15 |
| 4,581,733 | 4/1986 | Sarson et al. | 370/67 |
| 4,590,467 | 5/1986 | Lare | 340/825.5 |
| 4,759,017 | 7/1988 | Allan et al. | 370/85.11 |
| 4,792,948 | 12/1988 | Hangen et al. | 370/95 |

OTHER PUBLICATIONS

Motorola CENTRACOM Series II Control Center Systems, Field Maintenance Manual, Jun. 5, 1985.

Primary Examiner—Wellington Chin
Attorney, Agent, or Firm—Nixon & Vanderhye

[57] ABSTRACT

A multisite network switch for a series of RF digital trunked radio transceivers and dispatcher consoles. The switch establishes audio communications between different sites and various dispatcher consoles. The multisite switch has a distributed architecture in which each node of the switch is supported by a microprocessor controlled card. This card has a communications controller that routes messages between the internal switch bus, an outside port and an interface processor that controls the audio slots in the switch. The communications controller receives control messages from the switch bus, but discards redundant slot status messages by checking a slot status bit map stored in a memory unit on the card.

5 Claims, 13 Drawing Sheets

MULTI-SITE ARCHITECTURE

SWITCH CONTROLLER CARD ARCHITECTURE

MULTI-SITE ARCHITECTURE

SECONDARY SITE CAPTURE

SECONDARY SITE CAPTURE

PRIMARY RADIO UNKEY/DROP
PRIMARY SITE

PRIMARY RADIO UNKEY/DROP
PRIMARY SITE

SECONDARY SITE UNKEY

SECONDARY SITE UNKEY

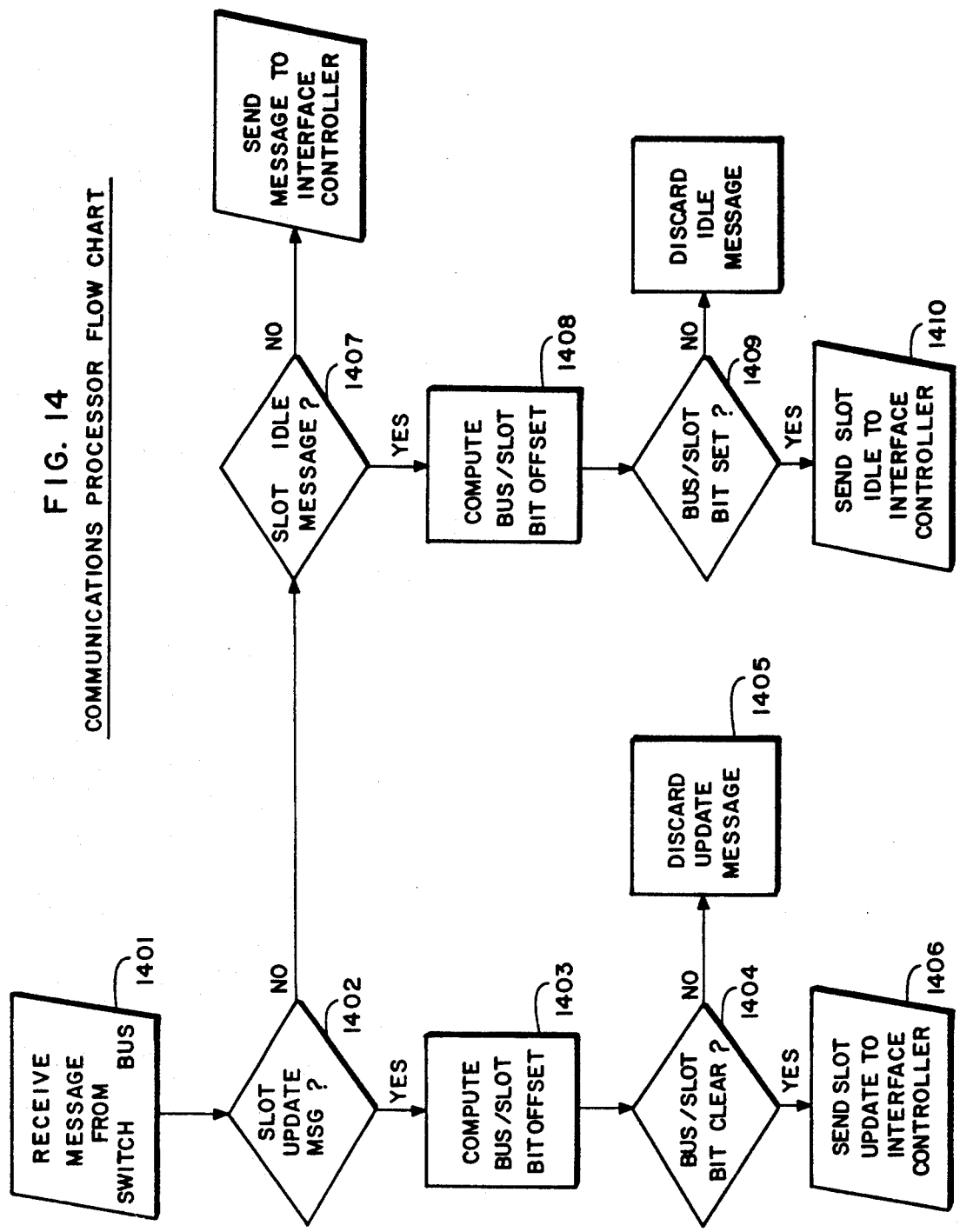

INTERFACE CONTROLLER FLOW CHART

MESSAGE BUS SLOT UPDATE/IDLE CONTROL IN RF TRUNKING MULTISITE SWITCH

RELATED APPLICATIONS

This application is related to the following copending commonly assigned U.S. patent applications.

Application Ser. No. 07/658,799, filed Feb. 22, 1991, which is a continuation-in-part of application Ser. No. 07/573,977 entitled "Distributed Multisite Coordination System" filed on Aug. 28, 1990 in the name of James L. Teel, Jr.

Application Ser. No. 07/532,154, filed Feb. 22, 1991, which is a CIP of 07/532,164, filed Jun. 5, 1990, entitled "Fail-Soft Architecture for Public Trunking System".

Application Ser. No. 07/658,843, filed Feb. 22, 1991, entitled "Dynamic Address Allocation Within RF Trunking Multisite Switch".

Application Ser. No. 07/658,798, filed Feb. 22, 1991, entitled "Multisite Switch System Controller Architecture" for RF Trunking Distributed Multisite Switch.

Application Ser. No. 07/658,637, filed Feb. 22, 1991, entitled "Protocol Between Console and RF Trunking System".

Application Ser. No. 07/658,636, filed Feb. 22, 1991, entitled "Audio Routing Within Radio Frequency Multisite Switch".

Application Ser. No. 07/658,844, filed Feb. 22, 1991, entitled "Distributed Multisite Switch Architecture".

The disclosure of these related copending applications are incorporated by reference.

FIELD OF THE INVENTION

This invention relates to a distributed network of trunked radio transmission systems in which command and audio signals from one radio system are routed by a switch through a distributed network to another system. In particular, this invention relates to the handling of control messages within the switch.

BACKGROUND AND SUMMARY OF THE INVENTION

Multiple-site RF transmission systems broadcast signals from more than one base station. This allows radio communications to cover a larger area than is possible with a single base station.

The present invention relates to a network of several single site trunked radio systems. An example of a single site transceiver system is disclosed in commonly-assigned U.S. Pat. No. 4,905,302, entitled "Trunked Radio Repeater System" and U.S. Pat. No. 4,903,321 entitled "Radio Trunking Fault Detection System" which are incorporated by reference. Digital trunked radio transceivers capable of handling communications between numerous mobile units and dispatcher consoles in a single area are known.

It is generally impractical for a single VHF/UHF RF repeater transmitting site to effectively serve a large geographical area. The broadcast area of a single site is limited by several factors. The effective radiated power of the antenna is subject to legal and practical limits. In addition, natural and man-made topographical features, such as mountains and buildings, block RF signal from certain locations.

Multiple transmitting sites are necessary to provide RF communications to all locations within a given locality. Multiple transmitters may be needed to cover a rural community covering many square miles or a city having tall buildings that block RF transmissions. FIG. 1 is a schematic diagram of a simplified multiple-site system having three radio repeater (transmitting) central sites S1, S2, and S3 providing communications to geographic areas A1, A2, and A3, respectively. Mobile or portable transceivers within area A1 receive signals transmitted by site S1, transceivers within area A2 receive signals transmitted by site S2, and transceivers within area A3 receive signals transmitted by site S3. Each site has a site controller that acts as a central point for communications in the site. To enable communications from one area to another, a switch networks the radio systems together to establish audio slots connecting one site controller to another. Thus, a caller in one area can communicate with someone in another area.

The present invention is directed to a multisite RF trunked repeater system that allows a caller in one site area (e.g. A1) to communicate with a callee in another area (e.g. A2). In a multisite network, each site assigns a specific channel to a call independently of the channel assignments made by other sites. Thus, a single call may be broadcast from several site transmitters each operating on a different frequency. A central multisite switch routes audio and command signals from one site to another, and to and from dispatcher consoles.

In multisite, the site controller (S1) receives a call from a mobile radio in A1 requesting a channel to communicate with a specific callee. A caller requests a channel simply by pressing the push-to-talk (PTT) button on his microphone. This informs the site controller that a channel is requested. The PTT signal is transmitted to the unit on a control channel that is continuously monitored by the site controller. The site controller assigns a channel to the call and instructs the caller's radio unit to switch from the control channel to the channel assigned to the call. This assigned channel is applicable only within the area covered by the site.

In addition, the site controller sends the channel assignment to the multisite network switch. The switch assigns one of its internal audio slots to the call. The switch also sends a channel request to all other site controllers or to only those site controllers having a designated callee within its area. Upon receiving a channel request, these secondary site controllers assign a channel to the call. Again, each secondary channel is operative only in the area covered by its secondary site controller. Each secondary site controller also sends a channel assignment back to the multisite switch. The switch connects the site controller line carrying the assigned channel to the assigned audio slot. The caller can then communicate with a unit or group in an other area via the multisite switch. The call is initially transmitted to the primary (host) site controller, routed through the assigned audio slot in the switch and retransmitted by the secondary sites on various assigned channels in those other areas.

When the caller ends the call, the primary site controller deactivates the assigned channel for that site and notifies the network switch that the call is terminated. There may be a brief "hang time" after the end of the call during which the channel remains assigned. During this hang time, the call can be rekeyed without going through the channel assignment procedure.

When the call is dropped, the network switch sends an end of call command to the secondary site controllers. A call is terminated in a similar format and operation as the slot assignment. Instead of establishing an audio slot, the end of call command causes the assigned slots and channels to be released.

In addition to providing communications between mobile radio units in different areas, the multisite network switch provides communications between dispatchers and mobile radio units. The dispatcher consoles are connected to the network switch in the same manner as are the site controllers. A dispatcher console can issue a channel call request through the network switch to a site controller in another area to call a mobile unit or to another dispatcher console to call a dispatcher at another console.

In addition to all of the features that the mobile units have, each dispatcher console has the ability to participate in any call in its area or to its assigned groups. Thus, when a call comes through the network switch from another area to a mobile radio, the network switch informs the dispatcher console of the call in addition to notifying the site controller. The dispatcher can listen in or participate in the call to the mobile radio.

The network switch is also capable of handling calls to groups of mobile units and/or dispatcher consoles. The wide area switch manages group calls and monitors the network to ensure that the site controllers for all of the callees in the group assign a channel to the group call. If a channel is not assigned, the wide area switch advises the caller that the wide area call cannot be formed as requested. The caller then has the option of re-keying the call so as to reach those areas having assigned channels.

The present invention relates to a multisite switch having a distributed architecture. The logical functions of the switch are shared by various microprocessor operated nodes distributed throughout the switch. Each node includes a controller card and audio cards. The nodes share the computational workload of the switch. Within the switch, the nodes are coupled to each other by message and audio buses.

The nodes interface the switch with the other radio system components outside of the switch. Each node is connected to a site controller, dispatcher console, the system manager or other component of the overall radio system. The nodes coupled to site controllers are referred to as Master II Interface Modules (MIMs) and the nodes coupled to dispatcher consoles are referred to as Console Interface Modules (CIMs).

Distributed network multisite systems have a much faster data transfer rate than comparable central architecture multisite systems. Central computers process information serially. All communications passing through the switch must be serially processed by the central computer. The central computer slows communications because of its serial operation. Distributed network systems achieve parallel processing by sharing the computational tasks between several processors. Distributed networks are generally significantly faster than central computers.

There is a tremendous volume of control message traffic within the distributed multisite switch. The bulk of the messages relate to the status of the numerous audio slots within the switch. There are 1024 audio slots on 32 audio buses in the preferred embodiment of the switch. Messages regarding the status of each slot are regularly sent to all nodes over the message bus. Processing these messages could consume much of the processing capacity of the switch nodes, reduce the speed of the switch and degrade switch performance. One purpose of the present invention is to provide a novel method and apparatus that continuously keeps all nodes within the switch apprised of the status of each audio slot, but shields the principal processing unit within each node from redundant slot status messages.

Each node of a multisite network switch includes a controller card operated by microprocessors. The controller cards in each of the nodes have substantially the same hardware and are interchangeable. The MIM and CIM controller cards have identical hardware. Each site controller and each dispatcher console is coupled to a separate node in the switch. Each node acts as a gateway into the network for its site controller or dispatcher console.

The controller card in each node has a communications microcontroller, an interface microprocessor and a dual-port RAM that allows the controller and processor to communicate with each other. The principal logic element of the controller card is the interface processor that assigns audio slots to incoming calls, controls the audio boards in the node, acts on and generates message commands such as slot assignments, slot update and slot idle, performs overhead tasks for the node, and handles other logic functions. The communications controller routes messages passing through the node to and from message bus within the switch, the serial port to the site controller, dispatcher console or other unit, and to and from the interface processor within the node. The communications controller routes and translates messages, but performs few of the intelligence functions of the node. However, one intelligence function performed by the communications controller is to discard redundant audio slot status messages.

When a switch node assigns a call to an audio slot, the interface processor for the node sends a slot assignment message over the message bus to all other nodes in the switch. The slot assignment message identifies the assigned audio slot, the host node and other information. Every other node in the switch reads the slot assignment.

To track the status of each audio slot, each node maintains a bus slot bit map in its dual-port RAM. This bit map has a bit for each audio slot in the switch. By setting and clearing the bits in the map, each node tracks the status of each audio slot in the multisite switch. The interface processor maintains and updates the bit map. The interface processor and communications controller read the bit map to determine the status of the audio slots. If the node is to participate in the call, the interface processor sets the bit in the bit map corresponding to the audio slot identified in the message. The bit for the audio slot is not set if the node is not participating in the call.

After sending a slot assignment message, the primary (host) node periodically sends slot update messages to all other nodes over the message bus. Slot update messages contain the same information as do slot assignment messages, but have a different identification header to distinguish updates from slot assignment messages. These update messages allow other late-coming nodes to participate in the call. A late comer could be a node in which the callee choose to participate in the call after the call began. Update messages also provide fault tolerance to lost or degraded slot assignment messages, or to a node that does not correctly act in response to a slot assignment.

Update messages are sent periodically for all audio slots in the switch regardless of whether the slot is carrying an active call. However, no update message is issued for slots that have not been activated since the switch was powered. Once a slot is activated for the first time, its host node will regularly send update or idle messages for that slot.

Update messages for audio slots carrying active calls are necessary for latecomers and for fault tolerances. Similarly, repetitive slot idle messages are needed to ensure that all audio connections are terminated when completed. A node that wrongly designates an idle slot as being active could force its site controller to maintain an open audio channel for a terminated call. Accordingly, repetitive idle messages are advantageous for the same reasons as are update messages for active slots.

With each node regularly issuing update and idle messages for all its audio slots, most of the messages on the message bus are for updates and slot idles. These messages could overwhelm the processing capacity of the nodes, if the interface processors in each node had to act in response to each update or slot idle message. The interface processor cannot be devoted to processing update and idle messages. The interface processor must be free to perform the important logical and control functions of the node.

The communications controller and the slot bit map in each node shield the interface processor from redundant update and idle messages. Upon receiving a slot update message, the communications controller checks whether the bit corresponding to the identified audio slot is set as being active in the slot bit map stored in its node's dual-port RAM. If the bit is set, then the node already has acted on the call in response to the original slot assignment or to an earlier slot update message. Since the update message is redundant, the communications controller discards the messages without notifying the interface processor. A similar procedure is followed with redundant slot idle messages. The interface processor is oblivious to these redundant messages and, thus, can be devoted to performing the logical functions of the node.

BRIEF DESCRIPTION OF THE DRAWINGS

FIG. 14 is a flow chart showing the operation of the communications controller in response to a message from the switch message bus.

DETAILED DESCRIPTION OF THE DRAWINGS

Figure 1:
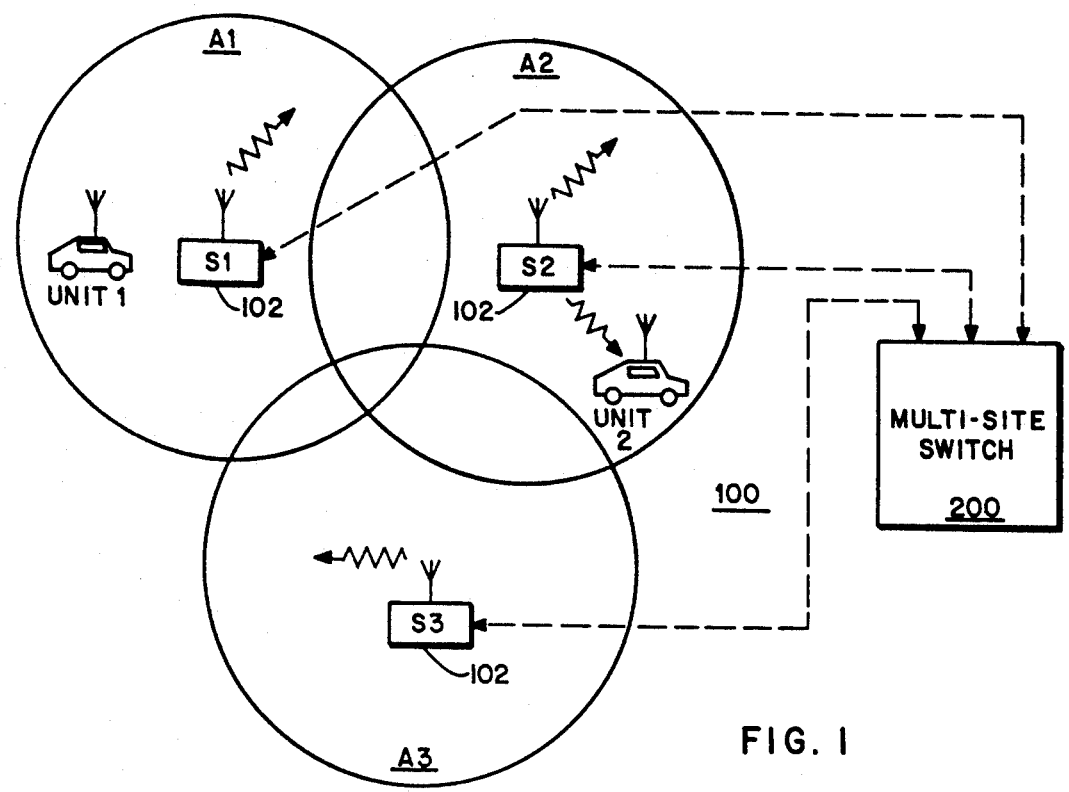
FIG. 1 is an illustration of three site radio system networked together by a multisite switch.

An exemplary trunked radio repeater system in accordance with the invention is generally depicted in FIG. 1. Individual remote units communicate with each other through shared radio repeaters that are part of the trunked repeater system 100. The system is composed of several sites 102. Each site includes a site transceiver that broadcasts signals over a certain area and a site controller. For example, site S1 broadcasts over area A1. The remote units can communicate with units within their own area or with units in other areas. The remote units also communicate with the dispatcher consoles.

Each site is controlled by a site controller, e.g., S1. The site controller controls the radio frequency data and audio traffic in its area. The site controller is described in more detail in the application and patents previously mentioned. For purposes here, each site controller communicates with the multisite switch 200. The multisite switch routes communications between sites and dispatch consoles.

Figure 2:
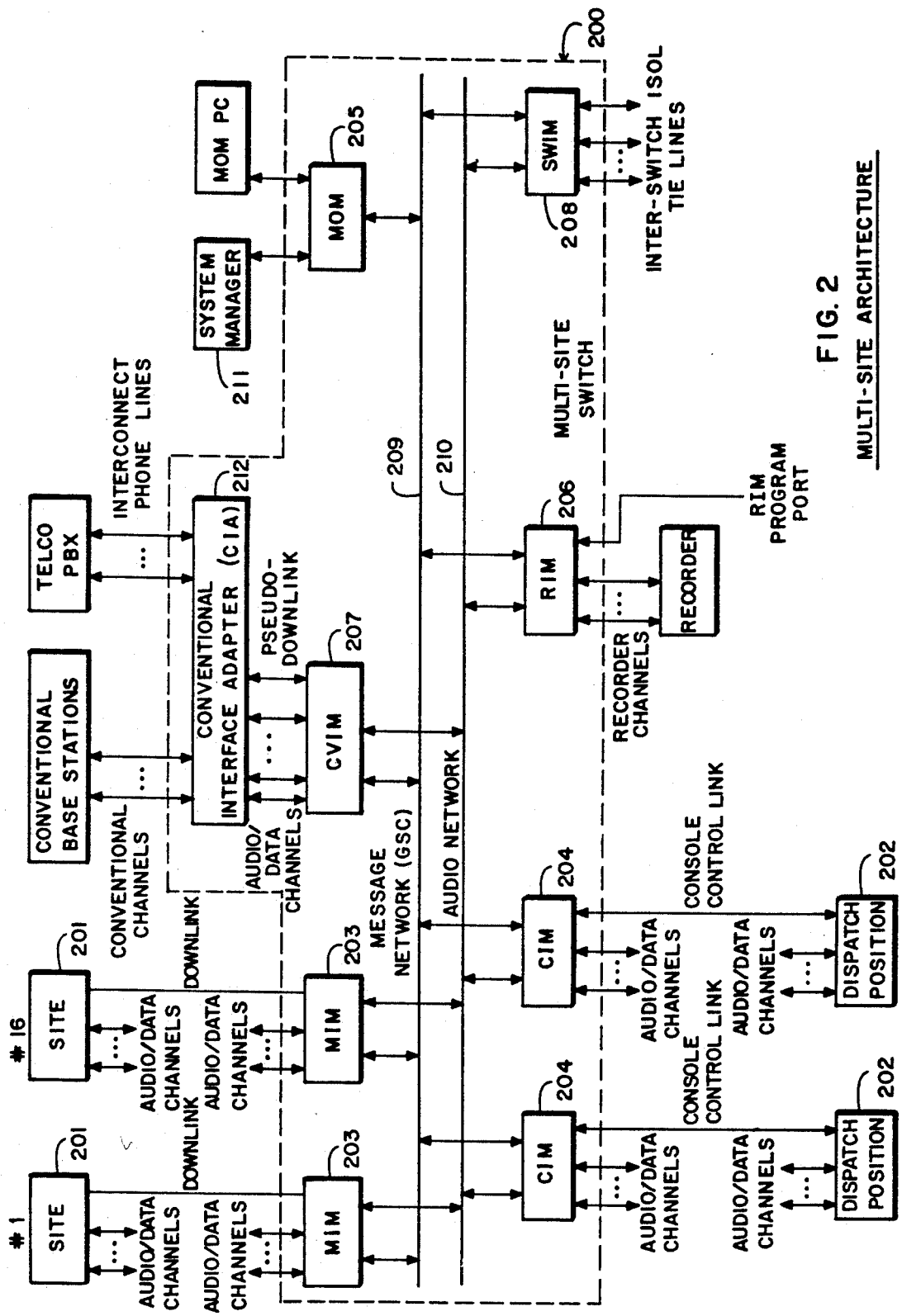
FIG. 2 is a schematic of the architecture for a distributed network multisite.

Communications between sites are conducted through the multisite switch 200 shown in FIG. 2. The multisite switch communicates with each site controller 201 and dispatcher console 202. There are data and audio communication lines between the multisite switch and each site controller and dispatcher console.

The primary responsibility of the multisite switch is to establish and remove audio connections between sites and dispatch consoles. The multisite switch comprises a local area network of nodes. As shown in FIG. 2, the nodes are labelled corresponding to whether they interface with a site controller, dispatcher console or other system component. For example, MIMs 203 are nodes in the switch that interface with site controllers and CIMs 204 are nodes that interface with dispatcher consoles. There are other nodes such as a Monitor Module (MOM) 205, Recorder Interface Module (RIM) 206, Conventional Interface Module (CVIM) 207 and a Switch Interconnect Module (SWIM) 208.

The MOM 205 is the interface for the system manager and the MOM PC (personal computer) that have supervisory responsibility for the switch and overall radio system. The system manager updates the databases in all of the nodes. The MOM maintains certain centralized databases including databases for smart calls and confirmed calls. Smart calls relate to the operation of the dispatcher console. A call is "smart" if the call has been selected, i.e., being listened to by the dispatcher via a select speaker in the console. If the call is not selected by at least one console, then a flashing indicator light appears on certain consoles. Thus, several dispatchers can readily see which calls are not being monitored by at least one dispatcher. Confirmed calls require participation of all of the intended callees. A confirmed call can begin audio transmission only after all of the sites having intended callees have confirmed the assignment of channels the call.

Each node in the multisite switch is supported by a microprocessor controlled communications card. All of the cards for the MIMs, CIMs, CVIM, MOM, RIM and SWIM have the same hardware and are interchangeable. The cards are said to have different personalities to indicate that they are assigned to, for example, a site controller or a dispatcher console (dispatch position). Each card can be easily configured to be a MIM, CIM, etc., by setting a few switches on the card. Thus, the cards are truly interchangeable.

The nodes of the switch are each connected to a digital message bus 209 and one or more digital audio buses 210. The message bus 209 is shown in FIG. 2 as a message network using an Intel 80C152 Global Serial Channel (GSC) microcontroller. This GSC microcontroller is the communications controller in the controller card in each node. The message bus is a high speed data bus that resides in the GSC microcontroller. The message bus interconnects the communications controller in the controller card of each node.

The audio bus 210 comprises 32 time division multiplexed buses. Each bus contains 32 slots that each carry a single audio channel. A maximum of 1024 audio slots may be routed through the switch (32 buses×32 slots). The slots are assigned to individual nodes and are coupled to the audio boards in the nodes. The operation of the audio slots and the audio boards are described in more detail in Application Ser. No. 07/658,636, entitled "Audio Routing Within Radio Frequency Multisite Switch" which is further identified above.

Figure 3:
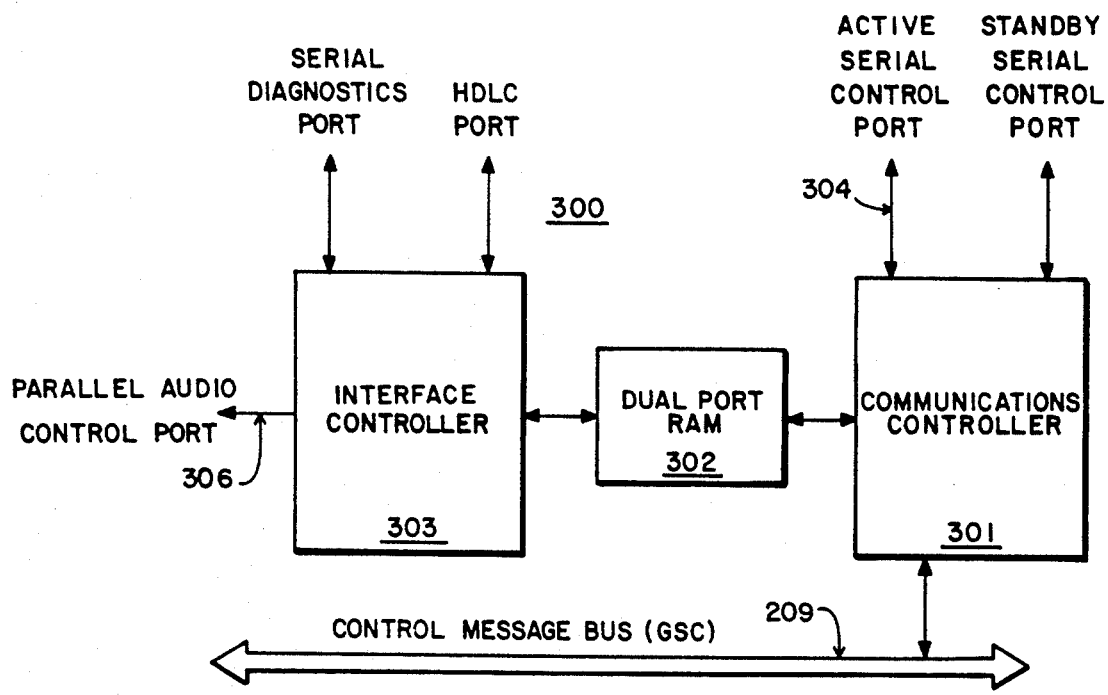
FIG. 3 is a block diagram of the switch controller card.

FIG. 3 shows a block diagram of one of the cards 300. This diagram is applicable to all of the nodes of the switch except for the conventional interface adapter (CIA). Thus, the hardware for the MIM, CVIM, MOM, SMIM, RIM and CIM is a switch controller card. Each card includes a communications controller 301, a dual-port random-access-memory (RAM) chip (302) and an interface processor 303.

The communications controller 301 is a message router. It routes messages between the control message bus 209, the serial port leading outside of the switch 304, the message bus in the switch and the interface processor 303 in the node through the dual-port RAM 302. In the present embodiment, the communications controller is an Intel 80C152 GSC microprocessor. The communications controller is coupled to the GSC message bus 209. This controller places messages onto the bus and receives messages from the bus. Messages received from the site controller over the serial port 304 are translated into a format usable by the multisite switch. The communications controller also translates switch messages into a format that the site controller understands.

The interface processor 303 performs substantially all logical functions for the node. In effect, the interface processor is the intelligence for the node. The interface processor, in this embodiment, is an Intel 80C186 microprocessor. The interface processor acts as a switch for the audio network and assigns audio switch slots to active audio site channels by operating the audio boards in the node via the parallel audio control port 306.

Each call through the switch is patched into an audio slot by the host MIM or CIM. When the call is terminated, the host cancels the call and makes the slot available for assignment to another call. The interface processor for each MIM assigns slots, connects audio slots to the site controller or dispatcher console to establish a communications link, and terminate slots. Since all MIMs and CIMs perform these functions, they must continually inform each other and the other nodes of their slot assignments. Accordingly, the MIMs and CIMs send messages regarding slot assignments, slot updates and slot idles over the message network 209 to other nodes.

The communications controller 301 for each secondary node initially processes all of the messages on the message network. Slot assignments are forwarded to the interface processor through the dual-port RAM. Redundant slot update/slot idle messages are not forwarded to the interface processor by the communications controller. Messages regarding slot updates or idle slots are processed by the communications controller by referring to a slot bit map located in the dual-port RAM storage 302. Update messages are sent periodically by a primary (host) MIM to confirm to the other nodes the active status of a slot. When a primary MIM terminates a call it sends a slot termination message to the other nodes. The primary MIM also periodically sends idle messages until the slot is reassigned to another call. Thus, all nodes are continually informed of the status of all slots that have been assigned at least once. Until a slot is initially assigned to a call, its host node does not send any messages regarding the status of the slot.

Figure 4:
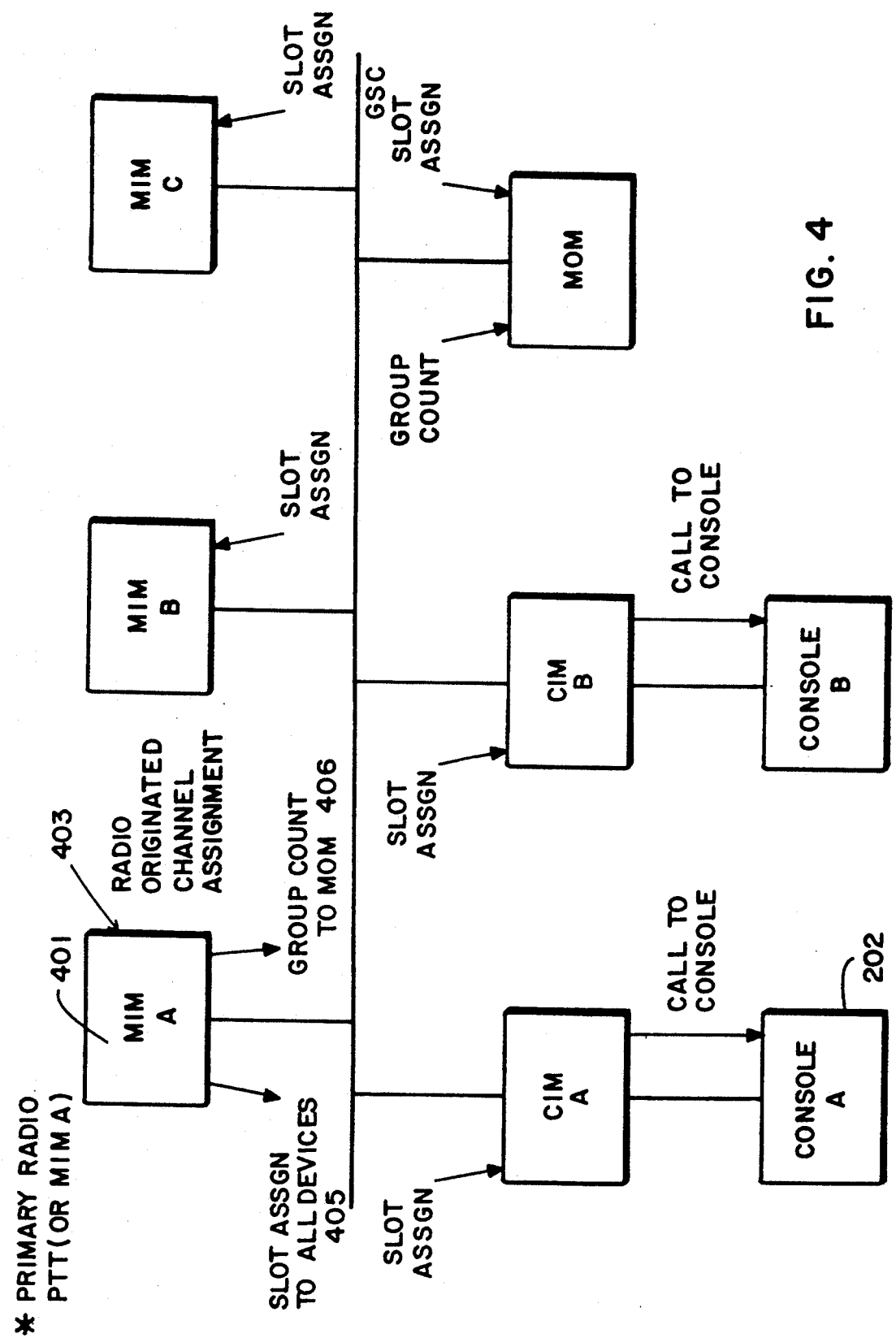
FIG. 4 is a message flow diagram for a primary radio push-to-talk (PTT) signal.

As shown in FIG. 4, a primary MIM 401 receives a radio originated channel assignment 403 from its corresponding site controller over the serial port 304. This signal indicates that a remote unit in the area assigned to the MIM wants to call another unit or a group and its site controller has already assigned a channel to the call for its area. All channel assignments are sent to the multisite switch. This channel assignment is received by the communications controller 301 in the MIM as are all communications from the site controller.

The MIM responds to the radio originated channel assignment by sending two messages on the message bus for the multisite switch. A slot assignment message 405 is sent to all switch components identifying the slot on the audio bus that is assigned to the call. A group count message 406 is sent to the MOM only if the count transitions from 0 to 1. The count is the number of group members in the site. A transition from 0 to 1 indicates that the caller has just selected the designated group and that the site did not have a member of that group.

Upon receipt of the slot assignment message, each CIM looks through its database to determine if the indicated callee is programmed at its corresponding console. If the callee is programmed, the CIM informs its corresponding dispatcher console of the call and connects the audio slot for the call to the dispatcher console. Thus, the dispatcher console can monitor all calls that involve groups or units that have been programmed to be assigned to the dispatcher.

Figure 5:
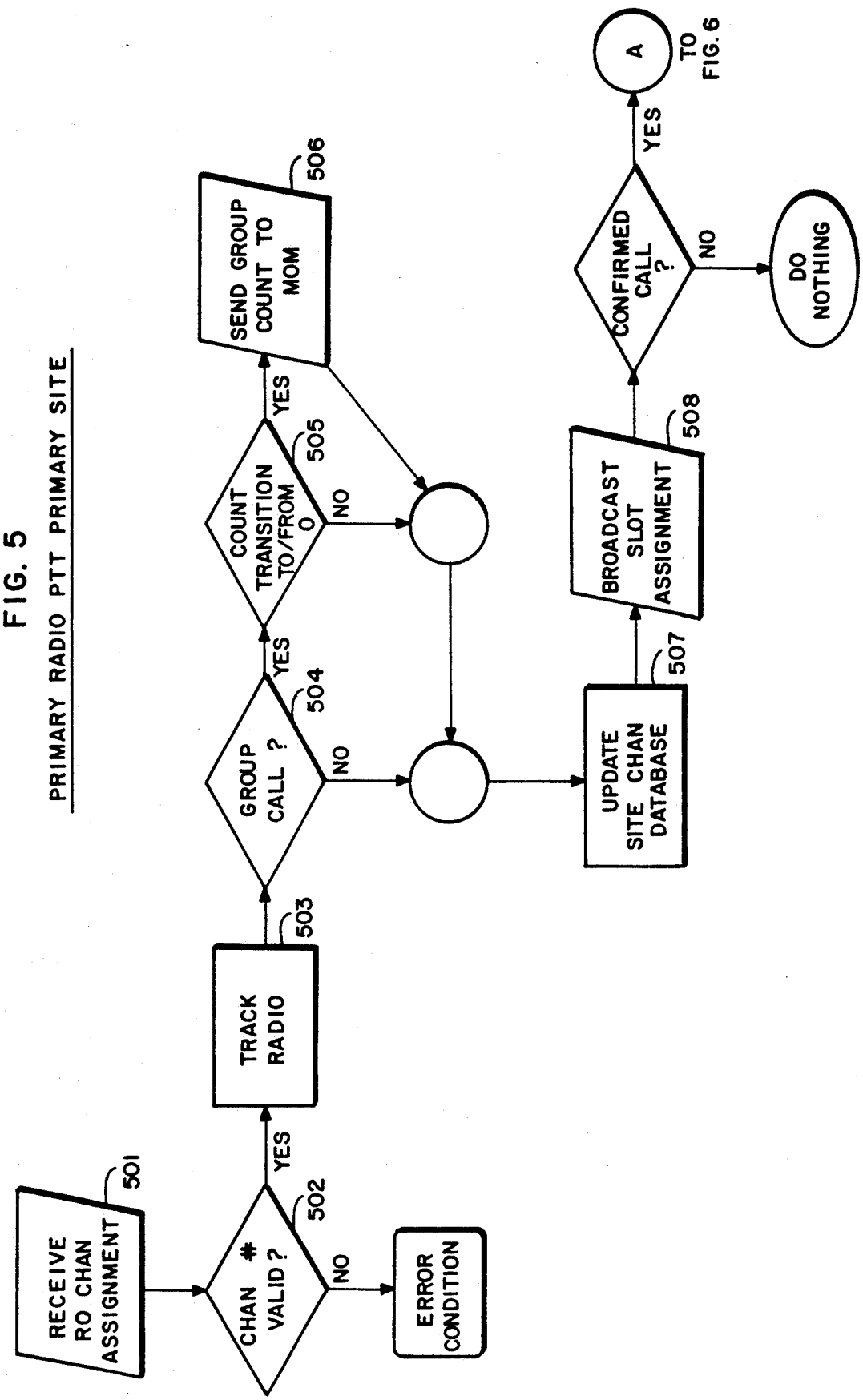
FIG. 5 is a flow chart for a primary radio PTT from a primary site.

As shown in the flow chart of FIG. 5, upon receipt of a radio originated call from the site controller, step #501, the primary MIM confirms that the channel number is valid in step #502. An error condition is signaled if the number is not valid. If the channel number is valid, then in step #503 the MIM tracks the unit making the call by setting the "on this site" bit for the unit in its unit database. In step #504 the MIM checks whether a group call is being made. If the call is to a group, then the count for that group is indexed to update the group count in step #505. If the count transitions to or from zero, then the group count is sent to the MOM in step #506. The MOM maintains a group count database that indicates which nodes (MIMs and CIMs) correspond to active group members. After handling the group count, the site channel database is updated to reflect the new channel assignment in step #507. The MIM keeps track of all slot assignments that it generates.

The MIM translates the channel assignment as sent by the site controller into a slot assignment for use within the multisite switch. In step #508, the slot assignment is broadcast to all other switch components. The primary MIM logs the channel as active so that it will be serviced by the MIM's background updating task. The principal updating task is to send slot update messages to the other nodes.

Figure 6:
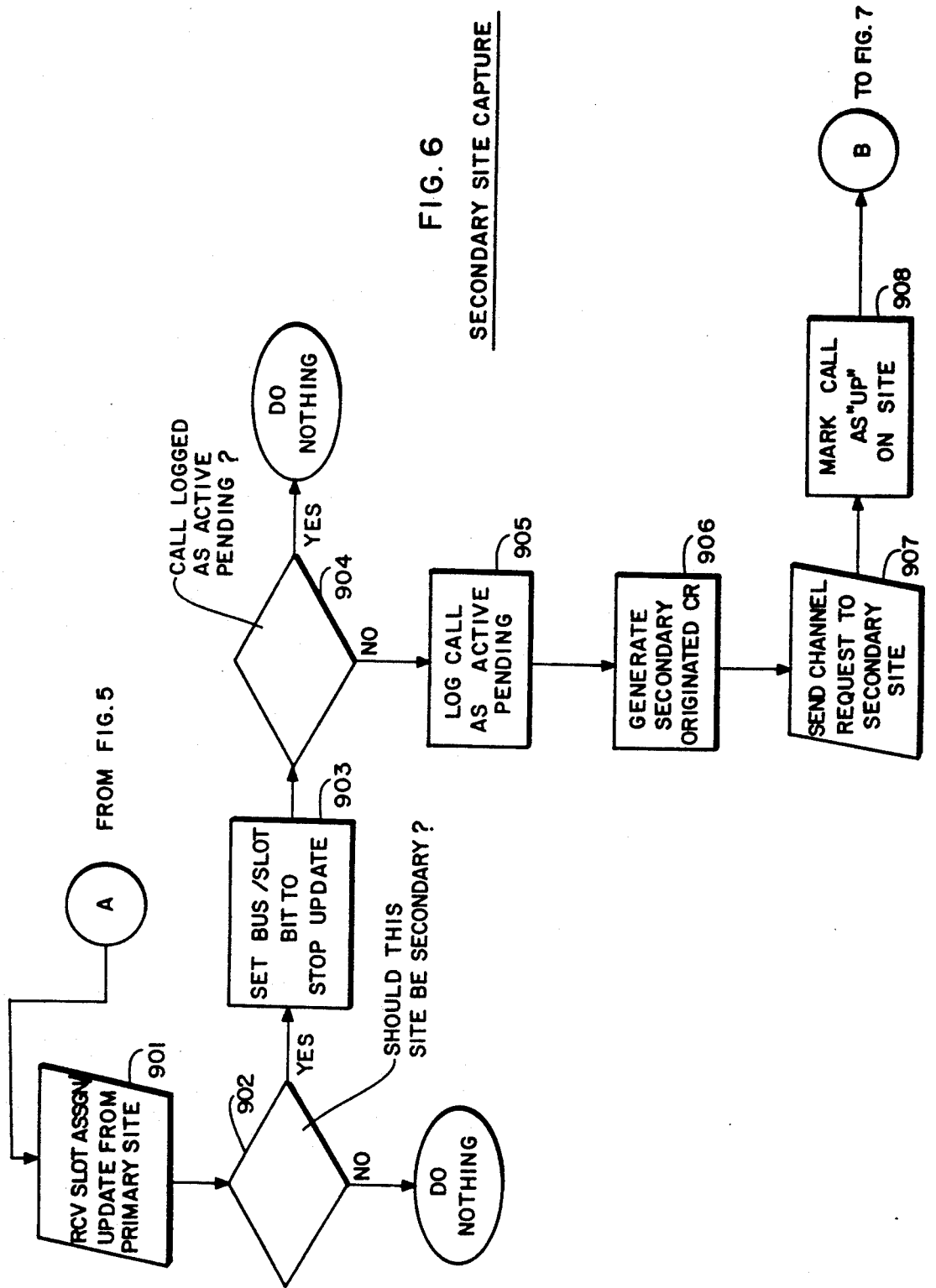
FIG. 6 is a flow chart showing a secondary site capturing a channel request from a primary site.

As is shown in FIG. 6, the secondary MIMs receive to a slot assignment and a slot update from a primary MIM in step #901. In step #902, each MIM in the switch checks its databases to determine whether the callee is listed as being in its area. If the callee is not in its area, then the node does nothing. If there is a callee in its area, the MIM is designated as a secondary site. If the MIM is to participate in the call it sets the slot bit on the bit map maintained in the dual-port RAM to stop subsequent updates from being sent to the interface processor on the controller card, step #903. In step #904, secondary site MIMs check whether the call is already logged in as being pending, then the MIM does nothing in response to the update or slot assignment message. If the call is not logged in, then it is determined active pending in step #905. Active pending status means that the call is awaiting a channel assignment from the secondary site.

Figure 7:
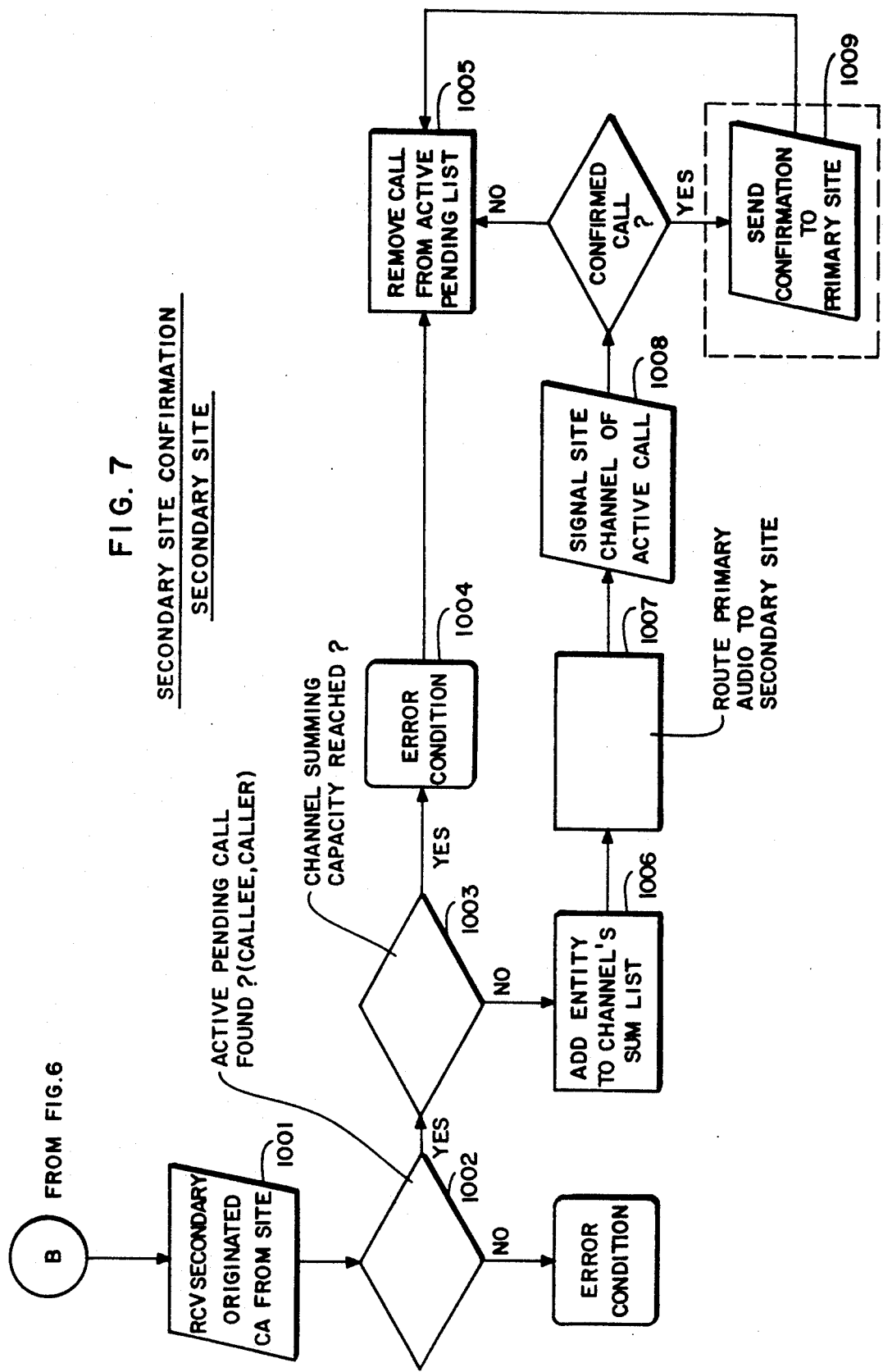
FIG. 7 is a flow chart showing a secondary site confirmation of a channel assignment.
Figure 8:
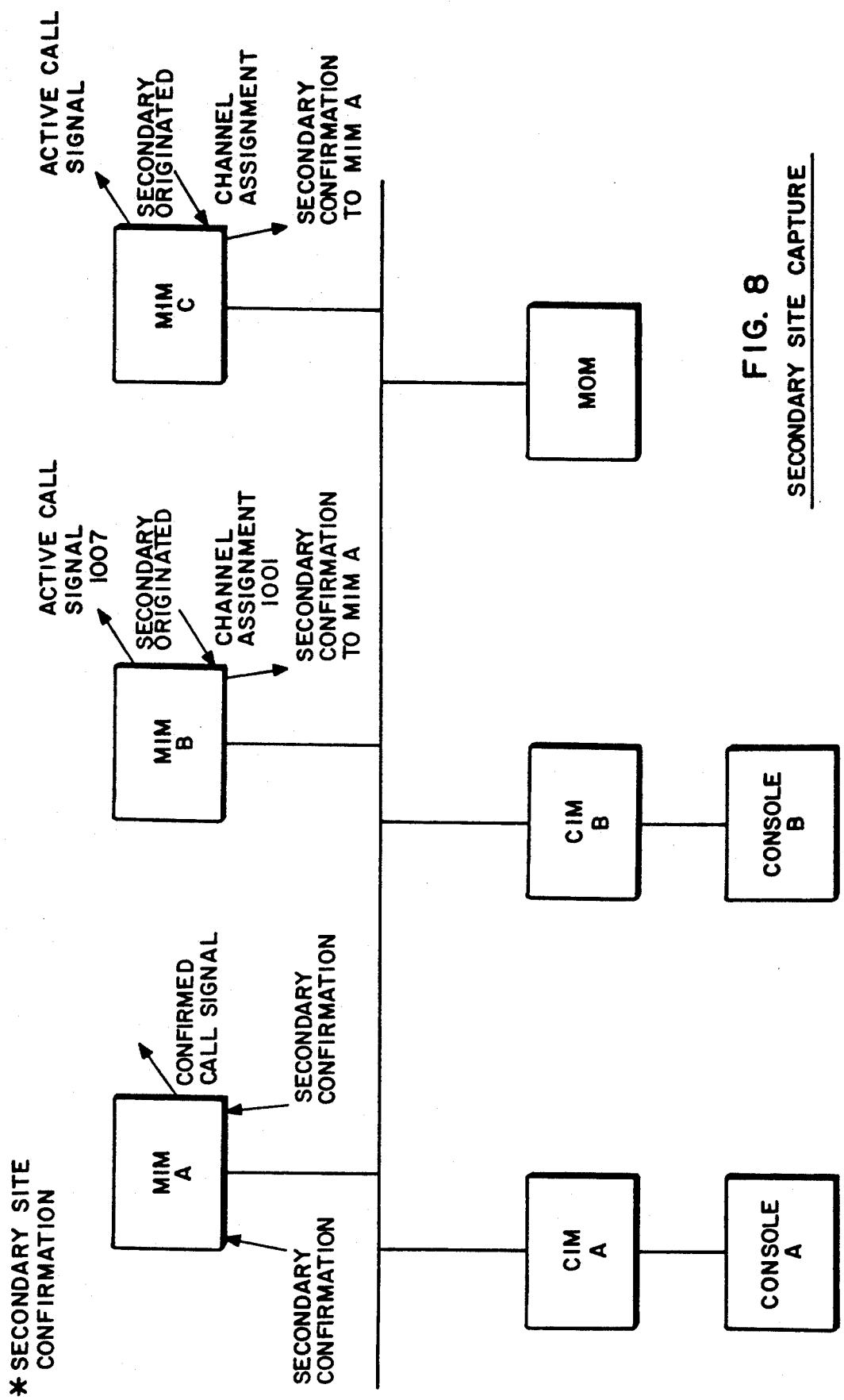
FIG. 8 is a message diagram of a secondary site capturing and confirming a channel assignment.

In step #906 and 907, the secondary MIM generates a secondary originated channel request (CR) and transmits it to its corresponding site controller. The MIM marks the call as being "up" on its site in step #908. As shown in FIGS. 7 and 8, when the site controller responds in step #1001 with a channel assignment (CA) by means of a secondary originated channel assignment from the site, the secondary MIM confirms in step #1002 that the channel assignment corresponds to an active pending call. If there is no active pending call, then an error condition is reported by the MIM.

Assuming the channel assignment matches a pending call, then the secondary MIM checks that its channel summing capacity has not been reached in step #1003. If the channel assignment would exceed capacity, then an error condition is reported and the corresponding call is removed from the active list in steps #1004 and #1005. If the capacity has not been reached, then, in step #1006, the channel assignment is added to the channel sum list maintained by the secondary MIM. The MIM then routes the audio slot from the primary MIM to the secondary site in step #1007. In addition, the MIM notifies its site controller that the call is now active, step #1008, and removes the call from the active pending list. If the call requires confirmation, then the secondary MIM sends a confirmation message via the message bus to the primary site in step #1009 before removing the call from the active pending list.

Figure 9:
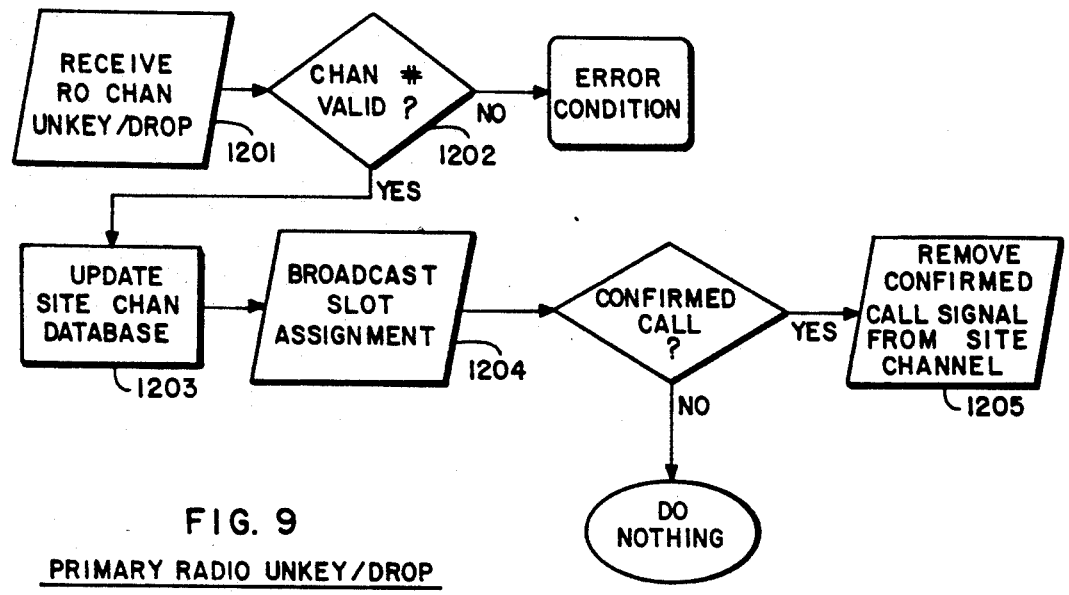
FIG. 9 is a message diagram of a primary radio unkeying/dropping a call.
Figure 10:
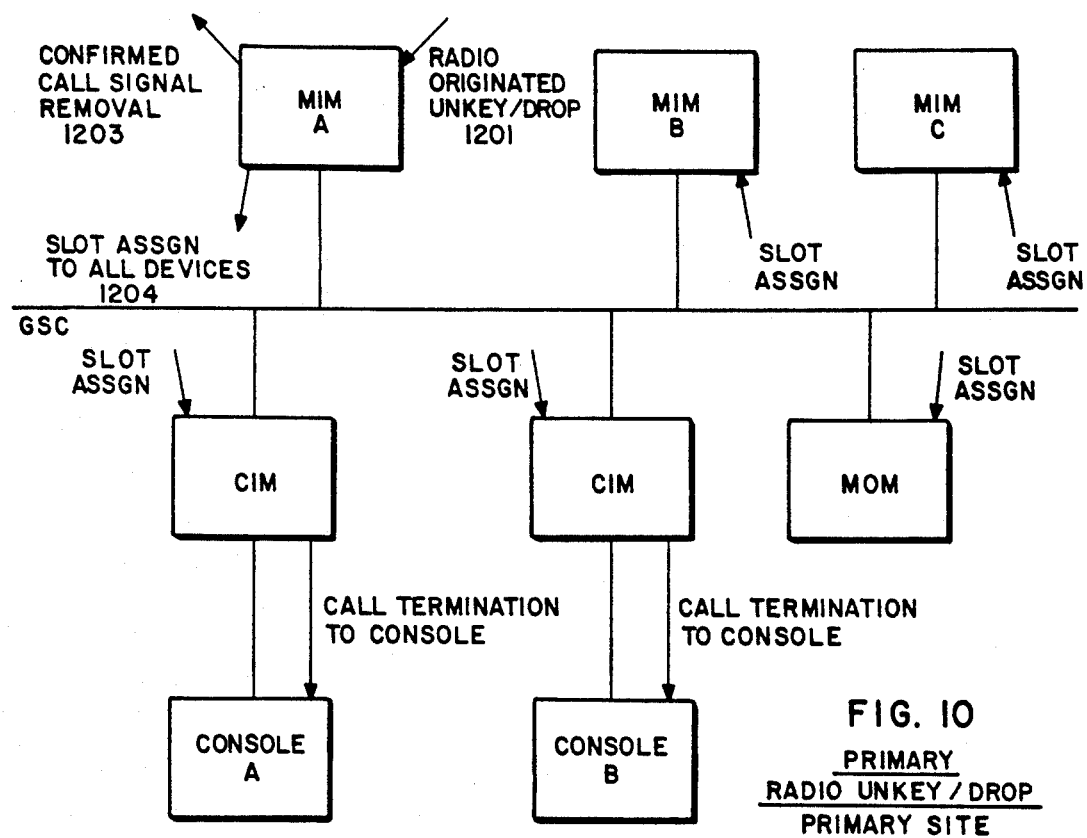
FIG. 10 is a flow chart of the primary radio unkeying/dropping a call.

As shown in FIGS. 9 and 10, the caller terminates a call by unkeying the PTT in his mobile radio. The site controller transmits an unkey or drop signal 1201 to the primary MIM. A drop signal terminates a call and causes the slot to be idled. Unkeying for many calls, such as transmission trunked calls, also immediately generates a drop signal. For some calls, such as message trunking, there is a brief "hang time" between an unkey signal and a drop signal. The unkey signal by itself does not cause the site controller to deactivate a channel or a MIM to idle a slot. If there is a hang time between the unkey signal and drop signal, then during the hang time the audio communication line between the caller and callee(s) is maintained even though the caller is not transmitting. If the caller rekeys the call during this hang time, then he can immediately begin talking on the existing communication line. If the hang time expires before the call is rekeyed, then a drop signal is sent to terminate the channel assignments and slots.

In step #1202, the primary MIM confirms that the unkeyed channel is listed as being valid in its databases. Assuming that the channel is valid, then the primary MIM sends a confirmatory call removal signal 1203 to the site controller indicating that the channel is to be removed from the active list and thereby update the channel database held by the site controller. The primary MIM also sends a slot idle message 1204 to the other nodes of the multisite switch informing them that the channel has been dropped. Additionally, if the call was confirmed, then the primary MIM removes the confirmed call signal from its site channel database in step #1205. Upon receipt of the slot idle message from the primary MIM, the CIMs notify their respective dispatcher consoles of the call termination 1206.

Figure 11:
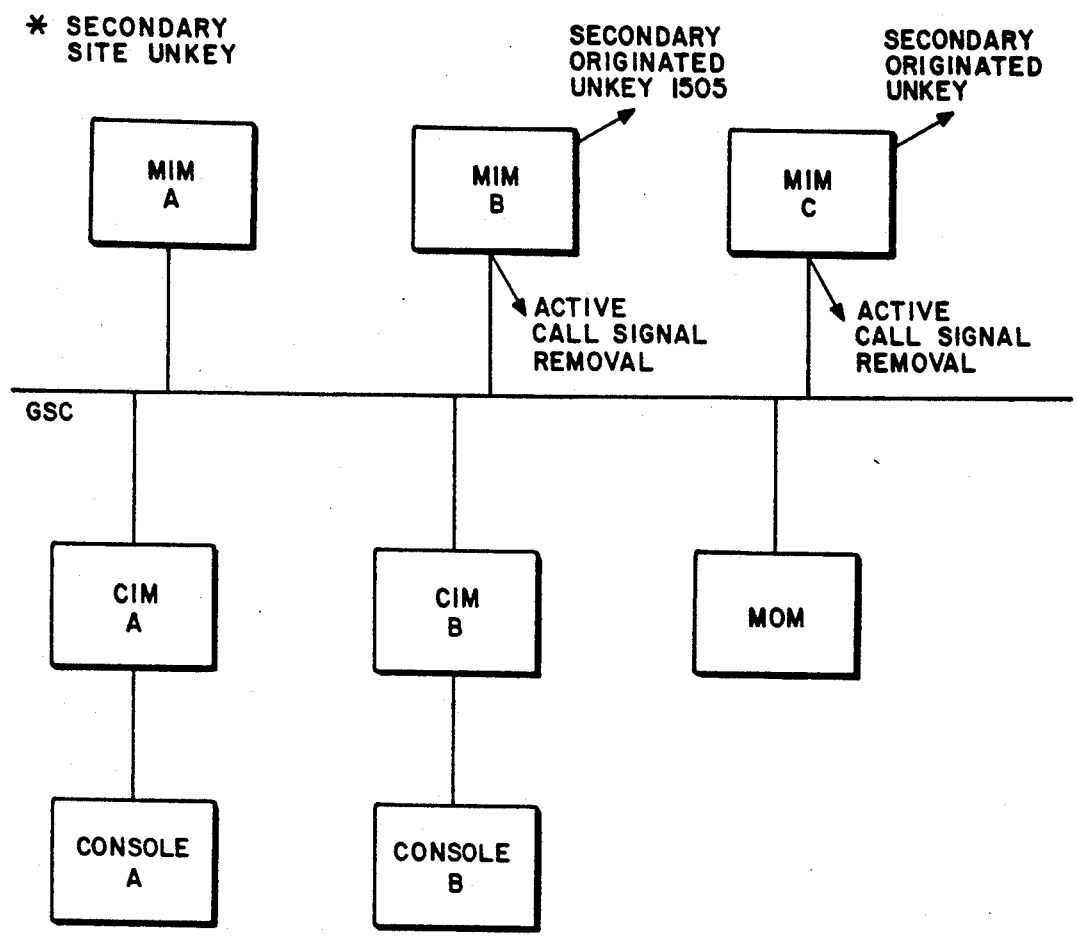
FIG. 11 is a message diagram showing a secondary site receiving an unkey and/or message drop signal.
Figure 12:
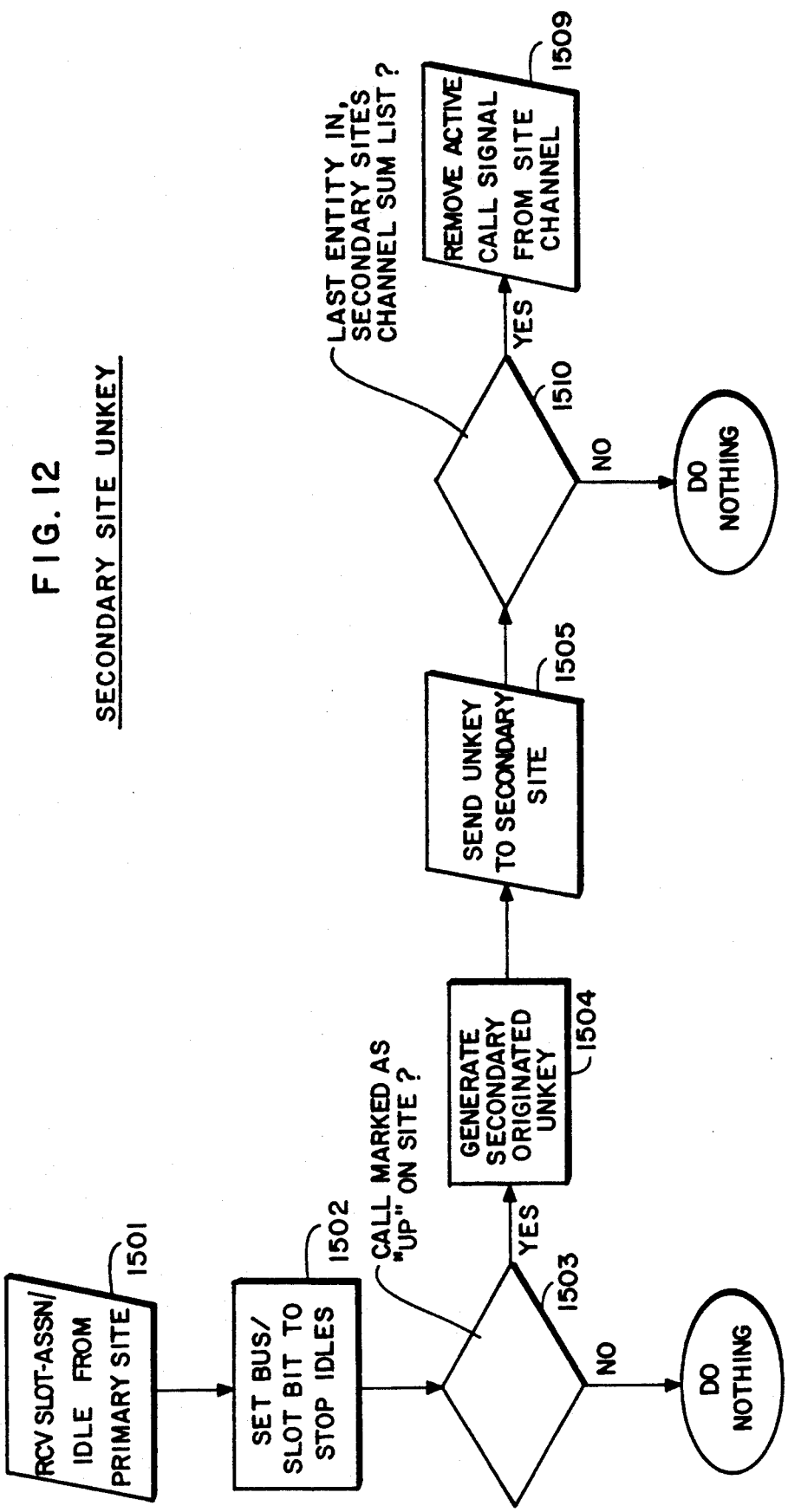
FIG. 12 is a flow chart showing a secondary site receiving an unkey/message drop signal.

As shown in FIGS. 11 and 12, when the secondary MIMs receive a slot assignment message that states that a caller has unkeyed from the call in step #1501, they each check the bit for that slot in their respective slot bit maps. If the bit indicates the slot is active bit is set, then in step #1502 the bit is cleared to indicate that the audio slot is now idle. If the MIM had the call logged into its site as being active, step #1503, such as when a callee was in the site, then this secondary MIM generates and transmits a secondary originated unkey signal to its site controller in steps #1504 and 1505. If the secondary MIM also receives a channel drop from the primary MIM in step #1506, then the secondary MIM, designates the call as being down on its site, step #1508, and removes the active call signal from its list of site channels, in step #1509. The secondary MIM checks whether the unit that unkeyed is the last unit participating in the call in step #1510. If it is the last unit, then the secondary site removes the call from its list of active site channels after a "hang time."

Figures 13A, 13B:
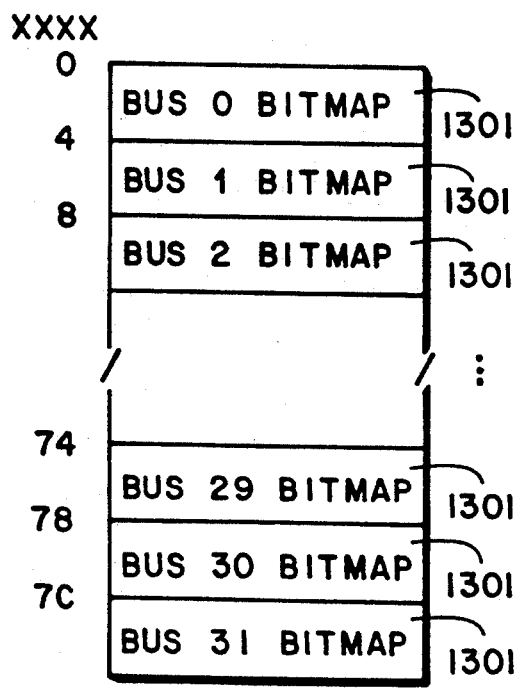
FIGS. 13A and 13B are diagrams representing the audio slot bit maps stored in the memory of each node of the multisite switch.

FIGS. 13A and 13B are diagrams of the bus slot bit map stored in the dual-port RAM 302 of each controller card. The slot bit map identifies the status of each audio slot on all buses. The bit map is updated by the interface processor when it receives slot assignment messages, slot updates and slot idle messages from the communications controller. In the preferred embodiment, the bit map is 128 bytes and segregated into individual bus bit maps for each of the 32 audio buses in the switch as is shown in FIG. 13A. For each audio bus, there is a bus bit map 1301 as shown in FIGURE 13B. Each bit (Sn) 1303 in this bus bit map corresponds to one of the 32 audio slots in the bus. The interface processor maintains the bus slot bit map by setting the appropriate bit in the map when it receives a slot assignment or slot update message that causes it to change the status of an audio slot. Similarly, the interface processor clears the set bit, when it receives a slot idle message. Since the bit map is stored in the dual-port RAM, the communication controller has ready access to the bit map and can itself determine whether a particular audio slot is active by checking the map. The communications controller does not disturb the interface processor when it checks the bit map and, thus, allows the interface processor to devote its processing capacity to tasks other than redundant slot status messages.

FIG. 14 is a flow chart showing the operation of the communications controller in response to a message on the switch message bus. In step #1401, the communications controller receives a message from the message bus. The communications controller is principally a message router and does not perform other logical functions. However, the communications controller does process on its own slot update and slot idle messages. In step #1402, the communications controller checks whether the message is a slot update message. If so, the communications controller in step #1403 computes the bus/slot offset for the particular audio slot designated in the slot update message. This computation allows the controller to address the corresponding bit in the bus slot bit map stored in the dual-port RAM. In step #1404, the communications controller accesses the bit map and determines whether the bit corresponding to the audio slot is clear. If the bit is set, then the message is discarded as being redundant in step #1405. If the bit is clear, then the slot update message is sent to the interface processor via the dual-port RAM in step #1406 for additional processing. Accordingly, the communications controller follows a very simple logical algorithm in response to a slot idle message before deciding whether the message should be discarded or passed on to the communications controller.

If the communications controller receives a message other than for a slot update, the processor checks whether the message is for a slot idle in step #1407. If the message is not a slot update or a slot idle message, then the message is passed to the interface processor without action by the communications controller. Accordingly, all messages are sent to the interface processor except for redundant slot update and slot idle messages.

Once the communications controller determines that the message is a slot idle message, the controller checks whether the message is redundant to an earlier slot idle message. In step #1408, the offset of the particular audio bus and slot is calculated from the information provided in the idle message. In step #1409, the communications controller accesses the slot bit map to determine whether the bit that corresponds to bus/slot is set. If the slot is not set, i.e., clear, then the idle message is discarded as redundant. If the bit is set indicating that the bus/slot is designated as being active, then the idle message is passed to the interface processor in step #1410.

Figure 15:
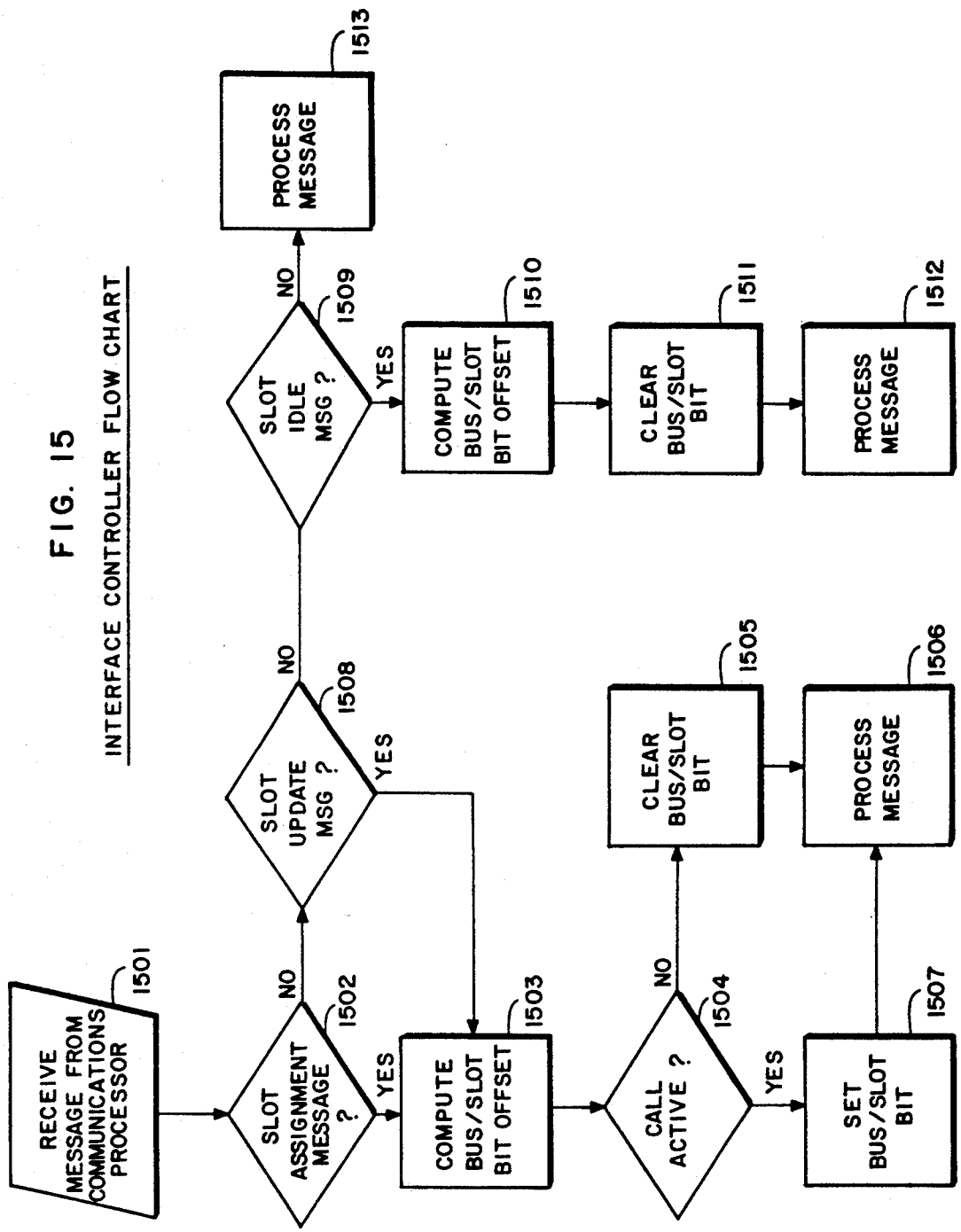
FIG. 15 is a flow chart showing the operation of the interface processor in response to message from the communications controller.

FIG. 15 shows the operation of the interface processor in response to slot status messages. In step #1501 the interface processor receives a message from the communications controller through the dual-port RAM. The procedure for transferring messages between the processors is more fully described in application Ser. No. 07/658,798, entitled "Controller Architecture for RF Trunking Distributed Multisite Switch" referenced above. Upon receiving a message, the interface processor first checks whether it is a slot assignment message in step #1502. If it is, then the controller calculates the address of the audio bus/slot identified in the message in step #1503.

If the slot assignment message indicates call termination, then the processor clears the bit corresponding to the identified bus/slot in the slot bit map, in step #1505, and then completes processing of the message in step #1506. If the slot assignment indicates that the call is active, then the interface processor sets the bit for the bus/slot in step #1507 and then continues processing the message. As shown in step #1508, slot updates are processed by the interface processor similar to slot assignment messages. Of course, the interface processor receives slot update messages only if the communications controller determines that the bit corresponding to the bus/slot in the slot bit map is clear.

If the message is not a slot assignment or an update, then the interface processor determines whether a slot idle message has been received in step #1509. If a slot idle message is received, then the controller computes the address of the bus/slot identified in the message in step #1510 and clears the bit at that address in step #1511. Finally, the interface processor continues processing the idle message as described above in step #1512. Similarly, the processor simply processes the message if it determines that the message is not for a slot assignment, update or idle in step #1513.

The format for the internal messages in the preferred embodiment of the multisite switch are described below. The messages are generated in response to console or site originated actions, such as a channel assignment or unkeying signal. They are sent from the primary (host) nodes to secondary (destination) nodes via the message bus. All messages are generated and processed within the switch.

A slot assignment message is broadcast to all nodes in the switch by an originator node upon assignment or release of an audio bus slot by that node. While the bus slot remains active, a slot update message is broadcast at an interval based upon current GSC message bus loading. Update messages are broadcast less frequently when the message bus is heavily loaded with other messages. This serves to include latecomers into a call that is already in progress.

| node sends: SLOT_ASSGN (102) for call activation SLOT_UPDATE (124) for active call update | | |
|---|---|---|
| # Bytes | Field | Function |
| (1) | message_id | SLOT_ASSGN/SLOT_UPDATE |
| (2) | bus_slot | Audio Bus & Slot number Low byte = Bus number High byte = Slot number |
| (1) | host | entity that call is on (site #, console #, etc.) |
| (1) | msg_group | Message group number |
| (1) | msg_sub_group | Message sub group number |
| (1) | call_variant | call qualifier flags |
| (3) | callee | entity receiving the call |
| (3) | caller | entity initiating the call |

The message group and sub group numbers indicate whether the call is active, dropped or unkeyed. A listing of messages group and subgroup messages is presented in application Ser. No. 07/658,799 entitled "Distributed Multisite Coordination System" and cited above. The call qualifier flags in the call variant field are used on a per call basis to tag any special features of the call. Thus, this field will vary with the type of call initiated. The bus and slot numbers will indicate which of the 32 audio busses and 32 audio slots are to be accessed for the active/terminated call's audio.

Once a call on a bus slot has terminated, the primary node broadcasts to all nodes a slot idle message. Like the slot update, the broadcast interval is based upon the current loading of the message bus. In the event that a secondary node missed the initial release message (slot assignment), the slot idle message enables the node to tear down (deactivate) the call.

| # Bytes | Field | Function |
|---|---|---|
| | node sends: SLOT_IDLE (125) | |
| (1) | message_id | SLOT_IDLE |
| (2) | bus_slot | Audio Bus & Slot number<br>Low byte = Bus number<br>High byte = Slot number |
| (1) | host | entity that call is on<br>(site #, console #, etc.) |
| (1) | msg_group | Message group number |
| (1) | msg_sub_group | Message sub group number |
| (1) | call_variant | call qualifier flags |
| (3) | callee | entity receiving the call |
| (3) | caller | entity initiating the call |

While the invention has been described in connection with what is presently considered to be the most practical and preferred embodiment, the invention is not limited to the disclosed embodiment. On the contrary, the invention covers various modifications and equivalent arrangements included within the spirit and scope of the appended claims.

What is claimed is:

1. A method for processing audio slot status messages in a switch having a distributed architecture of nodes including at least one primary node, and said nodes operatively coupled to a message bus and one or more audio buses, and wherein each node comprises a controller and an associated memory unit having a bit map of a plurality of audio slots on said one or more audio buses, said method comprising the steps of:
   a. broadcasting on the message bus a slot assignment message when said primary node assigns a slot from said plurality of audio slots to an audio communication, the slot assignment message identifying the slot being assigned;
   b. each node receiving the slot assignment message modifying its bit map to indicate the assignment of the slot identified in the slot assignment message;
   c. broadcasting on the message bus one or more slot update messages identifying the assigned slot;
   d. each node, upon receiving the slot update message, accessing its bit map and determining whether the bit corresponding to the assigned slot indicates that the slot is assigned;
   e. each node having a bit map that indicates the slot is assigned discarding the slot update message,
   f. each node having a bit map that indicates the bus/slot is not assigned, modifying its bit map to indicate the assignment of the slot identified in the slot assignment message.

2. A method for processing audio slot status messages in a switch having a distributed architecture of nodes operatively coupled to a message bus and one or more audio buses, at least one of said nodes being a primary node for connecting incoming audio signals to said one or more audio buses, and wherein each node comprises an interface processor, a communications controller and an associated memory unit accessible by the controller and processor and the memory having a bit map of audio slots in said one or more audio buses, said method comprising the steps of:
   a. broadcasting on the message bus a slot assignment message when said primary node assigns a slot from said plurality of audio slots to an audio communication, the slot assignment message identifying the slot being assigned;
   b. each node receiving the slot assignment message modifying its bit map to indicate the assignment of the slot identified in the slot assignment message;
   c. broadcasting on the message bus one or more slot update message identifying the assigned slot;
   d. the communications controller at each node receiving the slot update message, and accessing the bit map to determine whether the bit corresponding to the identified slot indicates that the slot is assigned;
   e. if the bit map indicates that the identified slot is assigned, then the communications controller discards the slot update message, and
   f. if the bit map indicates that the slot is not assigned, then the communications controller sends the slot update message to its associated interface processor.

3. A method as in claim 2 wherein steps b and f further comprise the interface processor modifying the bit map to indicate that the identified bus/slot is assigned.

4. A method for processing audio slot status messages in a switch having a distributed architecture of nodes operatively coupled to a message bus and one or more audio buses, wherein each node includes a processor and a memory, said method comprising the steps of:
   a. broadcasting on the message bus a slot assignment message identifying a slot in said one or more audio buses assigned to a particular audio communication;
   b. each node receiving the slot assignment message modifying a bit map in memory to indicate the assignment of the slot identified in the slot assignment message.

5. A method for processing audio slot status messages in a switch having a distributed architecture of nodes operatively coupled to a message bus and one or more audio buses, at least one of said nodes being a primary node for connecting incoming audio signals to said one or more audio buses, and wherein each node comprises an interface processor, a communications controller and an associated memory unit accessible by the controller and processor and the memory having a bit map of audio slots, said method comprising the steps of:
   a. broadcasting on the message bus a slot assignment message when said primary node assigns a slot on one of said one or more audio buses to an audio communication, the slot assignment message identifying a slot in said one or more audio buses being assigned;
   b. each node receiving the slot assignment message modifying its bit map to indicate the assignment of the slot identified in the slot assignment message.

* * * * *